United States Patent
Hansen et al.

(10) Patent No.: US 11,471,012 B2
(45) Date of Patent: Oct. 18, 2022

(54) INCINERATING TOILET WITH A LIFTING DEVICE

(71) Applicant: Cinderella Technology AS, Midsund (NO)

(72) Inventors: Frode Hansen, Lyngseidet (NO); Odd Arne Aslaksen, Furuflaten (NO); Hans Kristian Hegli, Trondheim (NO)

(73) Assignee: Cinderella Technology AS, Midsund (NO)

( * ) Notice: Subject to any disclaimer, the term of this patent is extended or adjusted under 35 U.S.C. 154(b) by 0 days.

(21) Appl. No.: 17/046,922

(22) PCT Filed: Apr. 15, 2019

(86) PCT No.: PCT/EP2019/059604
§ 371 (c)(1),
(2) Date: Oct. 12, 2020

(87) PCT Pub. No.: WO2019/201826
PCT Pub. Date: Oct. 24, 2019

(65) Prior Publication Data
US 2021/0161335 A1    Jun. 3, 2021

(30) Foreign Application Priority Data
Apr. 16, 2018 (NO) .................................. 20180518

(51) Int. Cl.
*A47K 11/02*    (2006.01)
*A47K 13/10*    (2006.01)

(52) U.S. Cl.
CPC ............ *A47K 11/023* (2013.01); *A47K 13/10* (2013.01)

(58) Field of Classification Search
CPC .................................................. A47K 11/023
(Continued)

(56) References Cited

U.S. PATENT DOCUMENTS

| 181,397 | A |   | 8/1876  | Beyron |
| 2,771,533 | A | * | 11/1956 | Osberg ................ A47K 11/023 |
|  |  |  |  | 4/111.5 |

(Continued)

FOREIGN PATENT DOCUMENTS

| CN | 1149820 A | 5/1997 |
| CN | 101100872 A | 1/2008 |

(Continued)

OTHER PUBLICATIONS

Office Action issued in Norwegian Application. No. 20180518; dated Oct. 15, 2018 (2 pages).

(Continued)

*Primary Examiner* — Lori L Baker
(74) *Attorney, Agent, or Firm* — Osha Bergman Watanabe & Burton LLP

(57) ABSTRACT

An incinerating toilet includes a toilet unit, a toilet casing, and a lifting device. The toilet unit includes a toilet bowl, an incineration chamber, and an ash tray. The toilet casing is arranged so as to cover a front and sides of the toilet unit and has a toilet cover and sitting ring connected on top. The lifting device is arranged for moving the toilet casing relative to the toilet unit, from a first position in which the toilet casing is covering the at least one part of the toilet unit, to a second position allowing access to the at least one part of the toilet unit in order to perform service and maintenance. The lifting device includes a spring-loaded device connected to the toilet casing and adapted to store mechanical energy in the first position, in order to provide a push or pull force when activated, for moving the toilet casing from the first position to the second position.

12 Claims, 10 Drawing Sheets

(58) Field of Classification Search
USPC .................. 4/111.1, 449, 221; 424/40, 76.1; 110/235
See application file for complete search history.

(56) References Cited

U.S. PATENT DOCUMENTS

| | | | | |
|---|---|---|---|---|
| 2,882,534 | A * | 4/1959 | Jauch | A47K 11/023 4/111.3 |
| 3,694,825 | A * | 10/1972 | Kufrin | A47K 11/023 4/111.3 |
| 3,703,732 | A * | 11/1972 | Green | A47K 11/02 4/111.3 |
| 3,723,828 | A * | 3/1973 | Edholm | A47K 11/023 361/163 |
| 3,827,378 | A * | 8/1974 | Kufrin | F23G 5/50 4/111.3 |
| 3,837,012 | A * | 9/1974 | Rassbach | A47K 11/02 4/111.3 |
| 3,860,973 | A | 1/1975 | Uyeda et al. | |
| 4,148,103 | A * | 4/1979 | Nishioka | A47K 11/023 4/111.1 |
| 4,425,671 | A * | 1/1984 | Nelken | E21F 9/00 4/111.3 |
| 4,546,502 | A * | 10/1985 | Lew | A47K 11/02 4/449 |
| 5,068,926 | A * | 12/1991 | Suzuki | E03D 11/11 4/318 |
| 5,778,462 | A | 7/1998 | Bjorklund et al. | |
| 5,924,141 | A * | 7/1999 | Fransson | A47K 11/02 4/111.1 |
| 6,449,783 | B1 | 9/2002 | Moser | |
| 8,646,123 | B1 | 2/2014 | Potvin et al. | |
| 9,867,511 | B1 * | 1/2018 | Wilburg | A47K 11/023 |
| 2004/0226494 | A1 * | 11/2004 | West, Jr. | A47K 11/023 110/235 |
| 2007/0062423 | A1 * | 3/2007 | Johansson | A47K 11/023 110/222 |
| 2007/0256218 | A1 * | 11/2007 | Gabriel | A47K 11/023 4/111.1 |
| 2011/0119816 | A1 * | 5/2011 | Aslaksen | F23D 14/70 4/111.4 |
| 2015/0208883 | A1 * | 7/2015 | Aslaksen | A47K 11/023 4/111.4 |

FOREIGN PATENT DOCUMENTS

| | | |
|---|---|---|
| CN | 104768348 A | 7/2015 |
| EP | 2892409 A1 | 7/2015 |
| GB | 389744 A | 3/1933 |
| NO | 336686 B1 | 10/2015 |
| WO | 2018/053610 A1 | 3/2018 |

OTHER PUBLICATIONS

International Search Report issued in International Application No. PCT/EP2019/059604, dated Jun. 13, 2019 (4 pages).
Written Opinion issued in International Application No. PCT/EP2019/059604; dated Jun. 13, 2019 (7 pages).
International Preliminary Report on Patentability issued in International Application No. PCT/EP2019/059604; dated Mar. 13, 2020 (14 pages).
Office Action in counterpart Chinese Patent Application No. 2019800264515 dated Aug. 13, 2021 (15 pages).
Van Hool T940 Luggage Bay Doors, Retrieved from Internet on Aug. 2, 2021; Retrieved from Internet: URL: http://www.youtube.com/watch?4fHCdYEOd8Y,search coach luggage doors (3 pages).

* cited by examiner

INCINERATING TOILET WITH A LIFTING DEVICE

The invention in related to an incinerating toilet comprising a toilet unit and an outer casing covering the toilet unit, which outer casing is moveable relative to the toilet unit by means of a lifting device. In particular, the present invention is related to an incinerating toilet with a lifting device for lifting the toilet casing relative to the toilet unit for providing access to the toilet unit.

BACKGROUND

An incinerating toilet comprises a toilet unit which in turn comprise the essential components of the toilet; a toilet bowl, an incinerating chamber and an ash tray for storing ashes from the combustion. In the later, the toilet unit is also referred to as the "inner part" of the incinerating toilet. Due to the high temperature of the combustion chamber, the incinerating toilets are often made with an outer casing covering the toilet unit, in order to insulate the toilet towards the surroundings. The outer casing provides in addition a better esthetic appearance.

The outer casing can be divided into different sections that can be opened for inspection or service of the inner part of the incinerating toilet located behind the outer casing. Known in the prior art is an incinerating toilet comprising an inspection hatch for inspection and emptying of the ash tray. The opening of the hatch is arranged in front of the toilet and towards the lower part of the toilet. As the opening it is cut out from the toilet casing, it will cause a weakening of the toilet casing which needs to be compensated by making the toilet casing larger in order to carry the weight of a user.

Publication US 181397 discloses an earth-closet having an exterior casing divided in an upper section and a lower section. The lower section is fixed to the toilet unit and the upper section can be lifted to provide access to the interior of the closet. Which upper part is hinged in a hinged connection making the upper section pivotably about the hinged connection. The drawback of this solution is that the hinged upper part provides less access to inner part of the toilet. Furthermore, the hinged solution does not easily allow the upper section to be removed entirely from the toilet.

Publication EP 2892409 A1 discloses an incinerating toilet comprising an outer casing made in one piece such that the complete outer casing is moveable to provide access to the inner parts of the toilet, such as the combustion chamber and the ash tray. The lifting arrangement comprises a pair of sliding rails arranged on either side of the toilet such that the outer casing can be lifted along the sliding rails. A support strap is arranged at the top of the outer casing and connected to the frame of the toilet, such that the support strap can hold the upper part of the toilet casing, to prevent the casing from falling out or rotating away in an uncontrolled manner.

The drawback of such a solution disclosed in EP 2892409 A1, is that the sliding rails does not give a good support for the toilet casing during the lifting operation. Especially for the stability in the sideway direction of the toilet. In addition, a system with sliding rails can easily get stuck during sliding operation along the sliding rails. Furthermore, the support strap arranged on the top of the outer casing does not provide a connection with good stability.

It is therefore desirable to provide a lifting system for a toilet casing that is stable and does not easily get stuck during operation. Furthermore, it is desirable to provide a system that gives easy and increased access to the inner part of the incinerating toilet.

It is an object of the present invention to provide an incinerating toilet which allows easy and increased access to the inner parts of the toilet in order to perform inspection, service and maintenance.

It is another object of the present invention to provide an incinerating toilet which can be made smaller in size, for use in areas with limited space, such as in caravans, trailers, camping cars or boats.

It is yet another object of the invention to provide a toilet casing lifting device that can easily adapt to existing toilet casings in form of retrofit.

SUMMARY OF THE INVENTION

The present invention is related to an incinerating toilet comprising:
  a toilet unit, which toilet unit comprises a toilet bowl, an incineration chamber and an ash tray,
  a toilet casing arranged such that it covers at least a part of the toilet unit, and
  a lifting device arranged for moving the toilet casing relative to the toilet unit, from a first position in which the toilet casing is covering the at least one part of the toilet unit, to a second position allowing access to the at least one part of the toilet unit.

The lifting device comprises a spring-loaded device adapted to store mechanical energy in the first position, in order to provide a push or pull force when activated, for moving the toilet casing from the first position to the second position.

The term "connected" is intended to mean either an indirect or direct connection. Thus, if a first device is connected to a second device, that connection may be through a direct connection, or through an indirect connection via other devices, components, and connections.

The spring-loaded device may comprise a first end connected to at least any one of an external: structure, framework or back wall.

Preferably, the spring-loaded device may comprise a first end connected to the toilet unit and a second end connected to the toilet casing.

A spring-loaded device is directed to a device that stores mechanical energy in order to provide a push or pull force when it is activated. Thus, the spring-loaded device may be any device adapted to store mechanical energy in order to assist and control the lifting/lowering of the toilet casing.

According to the present invention, the spring-loaded device may be any one of; a gas strut, a mechanical strut or a torsion spring.

Within the scope of the invention, a mechanical strut may be used to provide a push or pull force to the toilet casing. Unlike gas struts which derive output force from pressure, mechanical struts have mechanical systems internal to generate the push, pull, or self-centering force. They offer increased flexibility in force curves over the stroke. Dampening throughout the stroke is possible to integrate, although standard off the shelf models do not offer this feature, Mechanical Struts offer a seal-less, gas-less, and oil-less solution for strut applications.

The lifting device of the present invention may comprise a torsion spring that is tensioned in the first opposition and connected to one or more lifting arms. The one or more lifting arms are connected at one end to the toilet casing and opposite end to the toilet unit (or other wall or back structure). Upon activation, the tensioned spring releases its stored energy and activates the one or more lifting arms such that the toilet casing is lifted to the second position.

The spring-loaded device may be a gas strut.

A gas strut comprises an internal gas pressure, which gas pressure internal to the strut provides a push or pull force depending on configuration. The gas strut is a kind of spring that, unlike a typical mechanical spring that relies on elastic deformation, uses compressed gas contained within an enclosed cylinder sealed by a sliding piston to pneumatically store potential energy and withstands external force applied parallel to the direction of the piston shaft. The device also contains a dampening circuit typically to control the speed of motion through one or both directions of travel. Gas struts are also referred to as gas springs, gas pistons, gas shocks, among other names.

The gas strut may be suspended in an assembly of linkage arms (lifting arms). During the opening translation of the toilet casing, the linkage arms are geometrically suspended in a way that makes the gas strut's linear motion to be reduced, and hence compresses the gas strut, until the reach of the top "dead center". After passing the top "dead center", the gas strut is allowed to expand, and hence contribute to the opening motion of the toilet casing.

The lifting device may comprise a gas strut connected to the toilet casing at one end and to the toilet unit (or other back wall or back structure) at opposite end. The toilet casing may be connected to the toilet unit by a hinge at the upper section. The gas strut is arranged such that it stores mechanical energy in the first position and wherein upon activation, it releases its stored mechanical energy and pushes the toilet casing such that it pivots about the hinged connection and is tilted upwards to the second position.

The lifting device may comprise one or more lifting arms in cooperation with the spring-loaded device. The spring-loaded device adds thrust to the one or more lifting arms and wherein the one or more lifting arms assists by controlling the movement of the toilet casing.

In aspect, the lifting device may comprise one or more lifting arm connected to the toilet casing and wherein the spring-loaded device is connected to the toilet casing via the one or more lifting arm.

The one or more lifting arm may constitute a first lifting arm and a second lifting arm. Said lifting arms are arranged with a vertical distance between each other, and wherein each lifting arm has a first end pivotably connected to the toilet unit and a second end pivotably connected to the toilet casing.

The spring-loaded device may be connected to the first lifting arm or the second lifting arm for moving the first lifting arm or the second lifting arm.

The one or more lifting arm may be connected to the toilet unit in a cradle provided on the toilet unit. The cradle may be provided in a support arm connected to the toilet unit. The cradle is adapted to hold an end section of the one or more lifting arm.

At least one of the one or more lifting arm may comprise a hook adapted to cooperate with a cooperating pin provided on the toilet unit adjacent to the cradle, which hook and cooperative pin are arranged to be in a locked position during movement of the toilet casing from the first position to the second position, and wherein the hook and cooperative pin are arranged to be in an open position when in the second position, so that the one or more lifting arm can be lifted off the cradle such that the toilet casing can be separated from the toilet unit.

In cases where there are two or more lifting arms, it may be necessary that at least one lifting arm are provided with this hook and cooperative pin locking mechanism.

Within the scope of the invention the lifting device is arranged for lifting or lowering of the toilet casing, which means that the second position may be located either above or below the first position.

In the second position, the toilet unit located behind the toilet casing is exposed, such that inspection, service and maintenance can be performed. Preferably, in the second position, at least a part of the toilet unit is exposed. More preferably, in the second position, the entire toilet unit is exposed.

According to the present invention, the toilet unit comprises a toilet bowl, an incineration chamber and an ash tray, the toilet unit is also referred to as the inner part of the incinerating toilet. The toilet unit may also comprise at least any one of: framework, pedestal or structure in which at least one of the inner parts are mounted. The toilet unit may further comprise a back-wall structure where air intake and exhaust exits may be connected.

A toilet casing may be arranged in front of the toilet unit such that it covers the front part and sides of the toilet unit. Accessories, such as toilet cover and sitting ring are connected to the top of the toilet casing for covering the top part of the toilet unit. In use, only the toilet casing, sitting ring and the toilet cover are visible to the user.

The toilet casing may be made of a strong and hard material in order to carry the weight of a user, and in addition, the material need to have a smooth surface allowing easy cleaning and maintenance. In addition, the toilet casing may need to be light in weight. Therefore, toilet casing of incinerating toilet may preferably be made from plastic or composite materials.

As mentioned above under prior art, the toilet casing may be divided into separate parts, each covering different parts of the toilet unit. The different section may be arranged with a hatch together with locking means adapted for opening and closing of the hatch. The cutout or the dividing of the toilet casing into separate sections will cause a weakening of the toilet casing.

It is therefore, in a preferred embodiment of the present invention to provide a toilet casing in one-piece such that there are no cutouts or other cavities in the hull that will cause a weakening of the casing. Thus, the toilet casing may be fabricated or made in one piece such that it covers the front and side parts of the toilet unit.

Within the scope of the invention, the lifting device may be arranged for lifting and/or lowering a section, a hatch or a door. Preferably, the lifting device may be arranged for lifting and/or lowering the entire toilet casing.

The one or more lifting arm may constitute a first lifting arm provided at one side of the toilet and an auxiliary lifting arm provided at opposite side, and wherein the lifting device further comprises a through-going shaft connected between the first lifting arm and the auxiliary lifting arm. Movement of the first lifting arm at one side of the incinerating toilet, is transferred simultaneously through the through-going shaft to the auxiliary lifting arm, thus providing a synchronous lifting movement of the toilet casing.

The one or more lifting arm may further constitute a second lifting arm, the first and second lifting arms are arranged with a vertical distance between each other at one side of the incinerating toilet, and wherein each lifting arm has a first end connected to the toilet unit and a second end connected to the toilet casing and wherein the spring-loaded device is connected to at least any one of; the first lifting arm or the second lifting arm.

The spring-loaded device may comprise a first end pivotably connected to the first lifting arm and a second end pivotably connected to the second lifting arm, which spring-loaded device is adapted to control the movement of the toilet casing by moving the first and second lifting arm.

According to an aspect of the invention, the first and second lifting arms may be operable in in the same vertical plane. Within the scope of the invention, the lifting arms may also operate in two parallel, horizontally separated vertical planes. In other words, the first lifting arm is operable in a first vertical plane, and which second lifting arm is operable in a second vertical plane which is parallel to and horizontally separated from the first vertical plane.

In embodiment, a spring-loaded device may be pivotably connected to the first lifting arm at a first end and to the second lifting arm at the second end. The spring-loaded device is adapted to control the movement of the toilet casing. According to the invention, the term "control" is synonymous with "assist", "helping" or "allowing" the movement of the toilet casing. The spring-loaded device may be a gas strut.

In the first position of the toilet casing, the first end of respective first and second lifting arm is located in a position above the second end of respective first and second lifting arm. That means the arms are arranged with an incline from the first end towards the second end. In this first position the toilet casing is in a closed position covering the at least one section of the toilet unit. During lifting operation of the toilet casing, the second end of the first and second lifting arm will be lifted gradually (simultaneously with the toilet casing) to a location above the first end of said lifting arms. Wherein in the second position, the second end of respective first and second lifting arm is located in a location above the first end of respective first and second lifting arm.

In order to acquire a "kick-off" for the gas strut during activation, a crossbar may be arranged between the first ends of the respective first and second lifting arm. The cross bar is arranged to retain and fix the distance between the linkage arms and to resist the forces acting on the first ends of the linkage arms when the gas strut is activated.

The hook and cooperative pin arrangement may be arranged on the first lifting arm and the auxiliary lifting arm such that the toilet casing can be lifted away from the toilet unit in the second position.

In order o obtain a locking and open function, the hook may be arranged with a gap with one open end, which open end "releases" the cooperation with the pin when the lifting arm is rotated to the second position.

In other words, the pin may be fixedly connected to the toilet unit and arranged such that it is located inside the hook gap when moving from the first position to the second position. The pin thereby holds and locks the first end of the lifting arm to the cradle. The shape of the gap allows movement of lifting arm only in one direction. During rotation of the lifting arm, the pin will follow the inside curve of the gap, until in the second position, where the pin is located outside the hook gap, in which position the pin allows the first end of the lifting arm to be removed from the cradle.

In order to keep the outer casing and the toilet unit together as "one unit" in the first position, it is essential that the lower end of the toilet casing is proper connected to the toilet unit in the first position. The back of the incineration toilet may comprise locking means provided on respective toilet unit and the toilet casing for interaction and for retaining the toilet casing into the toilet unit. Within the scope of the invention, the locking means can be any one of; a snap lock, a hook, a magnet, retaining device or friction lock.

In aspect, the locking means may comprise a protrusion arranged at the back of the toilet unit for mating with a circumferential back opening of the toilet casing. In another aspect, the locking means may comprise a track and hook provided on a first section of the incinerating toilet and adapted to receive a cooperating pin or bolt provided on a second section of said toilet, such that the first and second sections are connected together.

The first section may be the toilet unit and the second section may be the toilet casing.

BRIEF DESCRIPTION OF THE DRAWINGS

The description above, as well as further objects, features and advantages of the present invention will be more fully appreciated by reference to the following detailed description of the preferred embodiment which should be read in conjunction with the accompanying drawings in which.

DETAILED DESCRIPTION OF THE DRAWINGS

Figure 1:
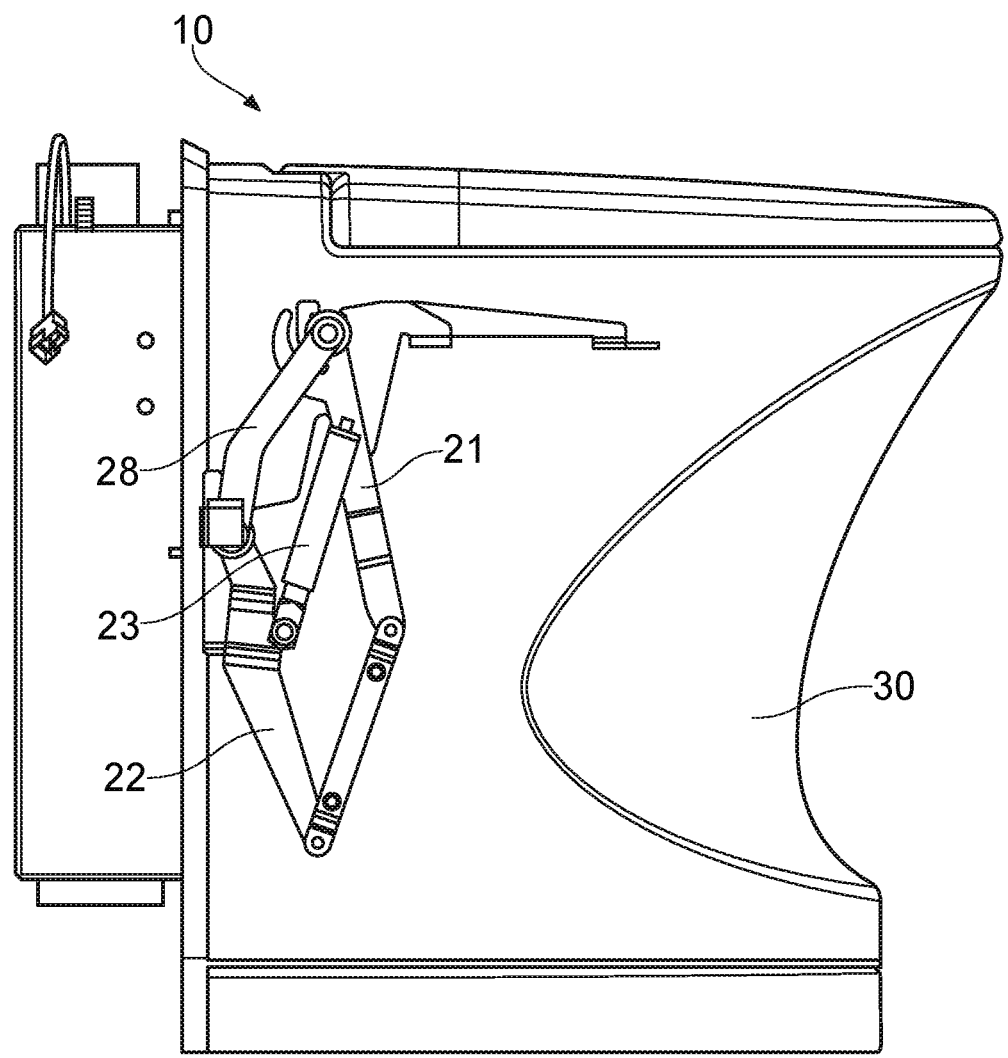
FIG. 1 shows a side view the incinerating toilet in the first position and where the toilet casing is made partly transparent to see the lifting device situated within.

FIG. 1 shows the incinerating toilet 10 arrangement according to the present invention. The incinerating toilet comprises a toilet unit 40 comprising the inner part of the toilet system such as toilet bowl, combustion chamber and an ash tray positioned on top of a base plate. The toilet unit 40 further comprises components such as a toilet frame and a combustion gas exit arranged at the back of the toilet unit 40.

The incinerating toilet in FIG. 1 comprises a toilet casing 30 made in "one-piece", which means that there are not cut-outs or other cavities provided on the body of the toilet casing 40. The toilet casing 30 is arranged such that it covers a front part, a side part and the top of the toilet unit 40 such that the inner part (toilet unit) of the toilet 10 is not visible to the user. Accessories such as toilet cover and sitting ring is connected to the toilet casing 30. In order to perform inspection, service and maintenance of the incinerating toilet 10, access to the toilet unit 40 needs to be provided.

FIG. 1 shows the incinerating toilet 10 viewed from the side and in the first position in which the toilet casing 30 is covering the toilet unit 40.

According to one aspect of the present invention, the entire toilet casing 30 can be lifted from a first position, when the casing 30 is covering the toilet unit, to a second position where the toilet casing 30 is lifted above and relative to the toilet unit 40, such that inspection, service and maintenance can be performed. The FIG. 1 shows the toilet casing 30 in the first position, which is the normal operation (user) position.

In FIG. 1 the casing 30 are made partly transparent in order to show the lifting device 20 of the present invention. The back part of the toilet casing 30 are connected to a corresponding back section of the toilet unit 40 by means of locking means (not shown). The locking means may be any one of; a snap lock, a hook, a magnet, retaining device or friction lock.

Figure 2:
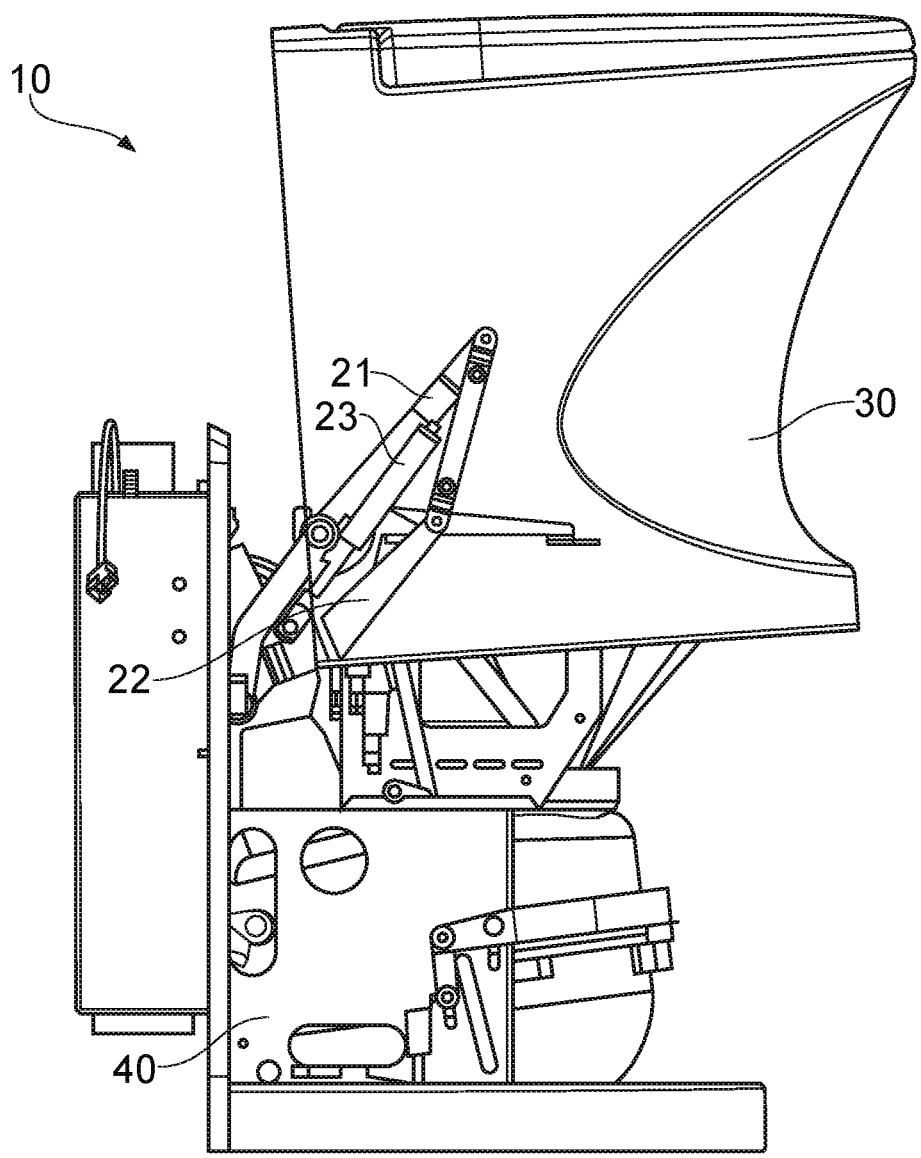
FIG. 2 shows a side view of the incinerating toilet in the second position when the toilet casing is lifted relative to the toilet unit.

FIG. 2 shows the incinerating toilet 10 viewed from the side and in the second position in which the toilet casing 30 is moved (lifted) relative to the toilet unit 40. As in FIG. 1 the toilet casing 30 are made transparent in order to see the arrangement of the lifting device 20.

The lifting device 20 comprises a first lifting arm 21 connected at first end 24 to the toilet unit and at a second end 25 to the toilet casing 30. See FIG. 4. In the first position the first lifting arm 21 is pivotably connected at its respective ends 24,25 such that it has a downward extending curve from the first end 24 to the second end 25, viewed in a vertical plane. The second lifting arm 22 is connected at the first end 24 to the toilet unit 40 and at a second end 25 to the toilet casing 30. The second lifting arm 22 is substantial parallel to the first lifting arm 21 and arranged in a location below the first lifting arm 21. The connection points of the first and second lifting arm 21,22 are all pivotable.

A linkage arm 29 may be provided between and connected to the first 21 and second 22 lifting arm. The linkage arm 29 may be mounted to the toilet casing 30 such that the lifting arms 21,22 are connected to the toilet casing 30 via the linage arm 29.

According to the present invention, the term "connected to" is related to direct or indirect connection.

A gas strut 23 is pivotably connected at one end to the first lifting arm 21 and the second to the second lifting arm 22. The gas strut 23 is arranged upward extending from the second lifting arm 22 to the first lifting arm 21. Said gas strut 23 comprises an internal stored mechanical energy in order to provide a push or pull force towards the first and second lifting arm 21,22 such that the toilet casing 30 can be moved.

Figure 3:
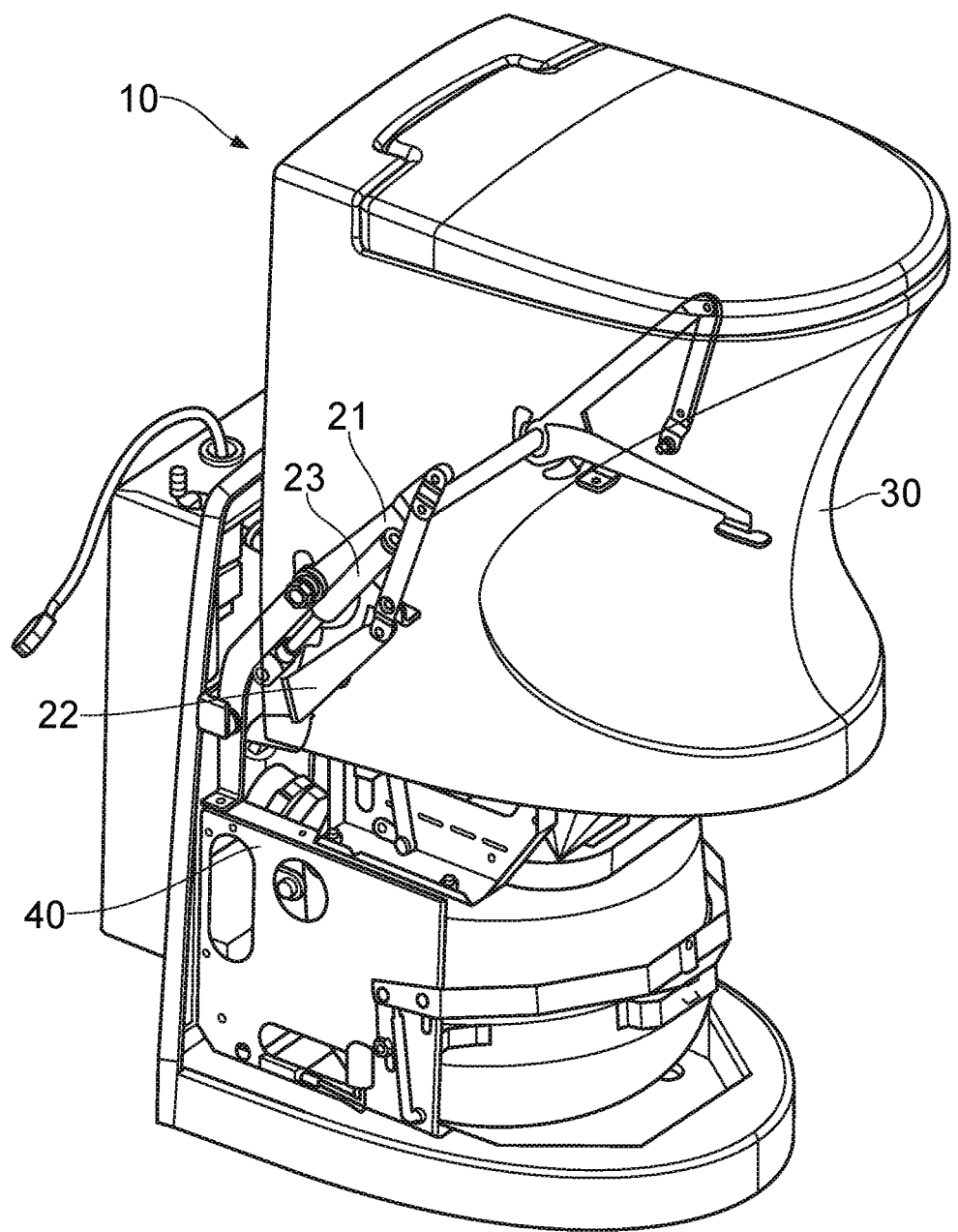
FIG. 3 shows a front and side perspective view of the incinerating toilet where the toilet casing is lifted to the second position.

FIG. 3 shows the side perspective view of the incinerating toilet 10 where the toilet casing 30 is lifted to the second position. The toilet unit 40 is accessible for the user, such that inspection, service and maintenance can be performed. In the second position, the first and second lifting arm 21,22 has rotated such that the second ends 25 which is connected to the toilet unit 40, is moved to a position located above the first end 24. Further, the gas strut 23 has been extended to the outmost position such that the toilet casing 30 is lifted to the second position.

Figure 4:
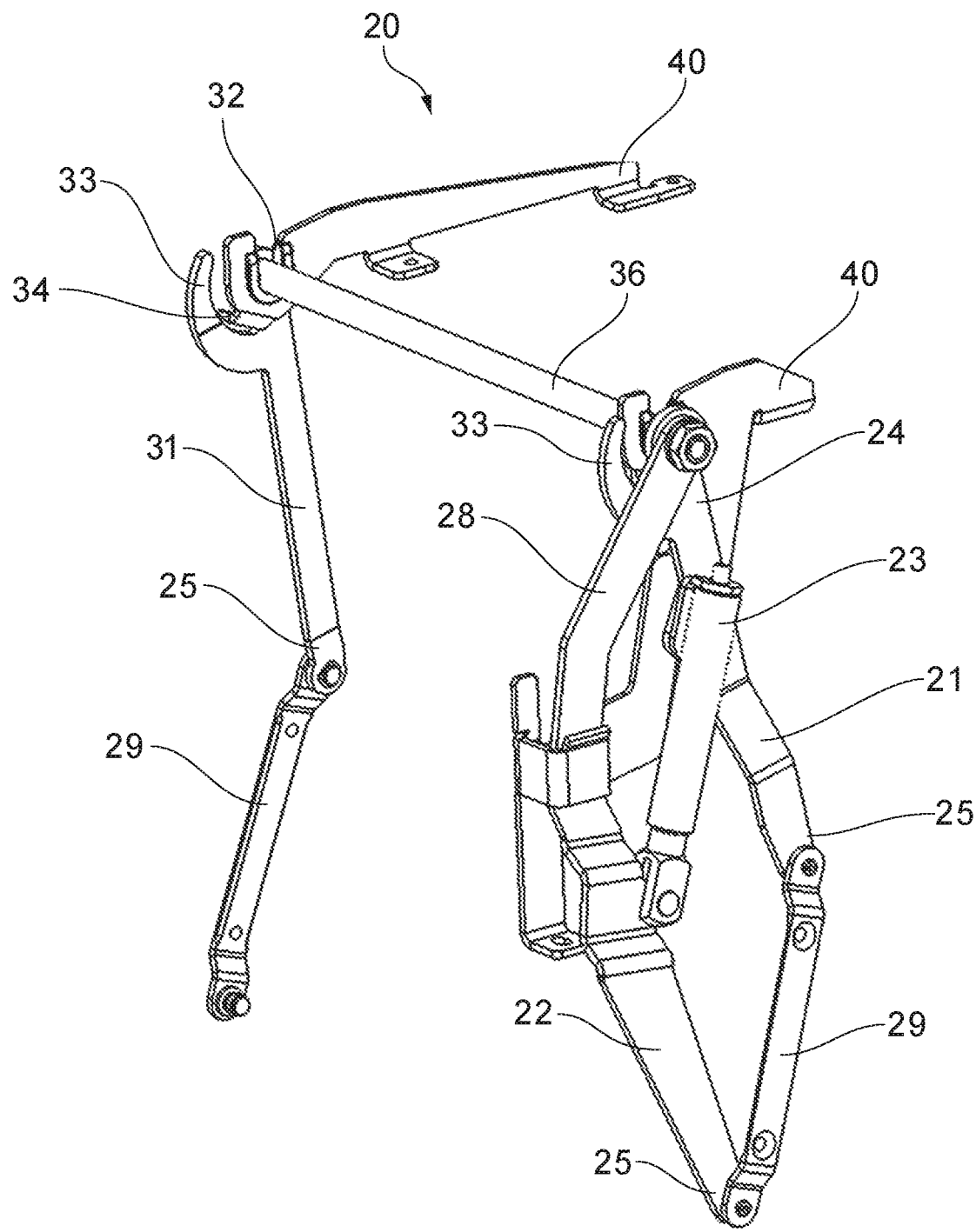
FIG. 4 shows the lifting device view from the first side and in the first lifted) position.

FIG. 4 shows the lifting device 20 according to the present invention, where the first and second lifting arm 21,22 is arranged at one side of the incinerating toilet 10. The lifting arms 21,22 is arranged with a vertical distance between each other.

In order to acquire a "kick-off" for the spring-loaded device, a crossbar 28 is arranged between the first ends of the respective first and second lifting arm 21,22. The cross bar 28 is arranged to retain and fix the distance between the linkage arms 21,22 and to resist the forces acting on the first ends 24 of the linkage arms 21,22 when the spring-loaded device 23 is activated.

Furthermore, the first lifting arm 21 is operable in a first vertical plane, and which second lifting arm 22 is operable in a second vertical plane which is parallel to and horizontally separated from the first vertical plane. According to the invention, the lifting arms 21,22 may also operate in the same vertical plane.

A trough-going shaft 36 extends from the one side of the toilet 10, where it is fixedly connected to the first lifting arm 21, to the opposite side of the toilet 10 where it is fixedly connected to an auxiliary lifting arm 31. During lifting operation, the gas strut 23 exerts a force to the first lifting arm 21 such that the end 25 of the first lifting arm 21 is lifted. Simultaneously, the lifting movement is transferred directly to the auxiliary lifting arm 31 through the through-going shaft 36. The result is that the lifting arms 21,22,31 contributes with a synchronous lifting motion of the toilet casing 30.

Figure 5:
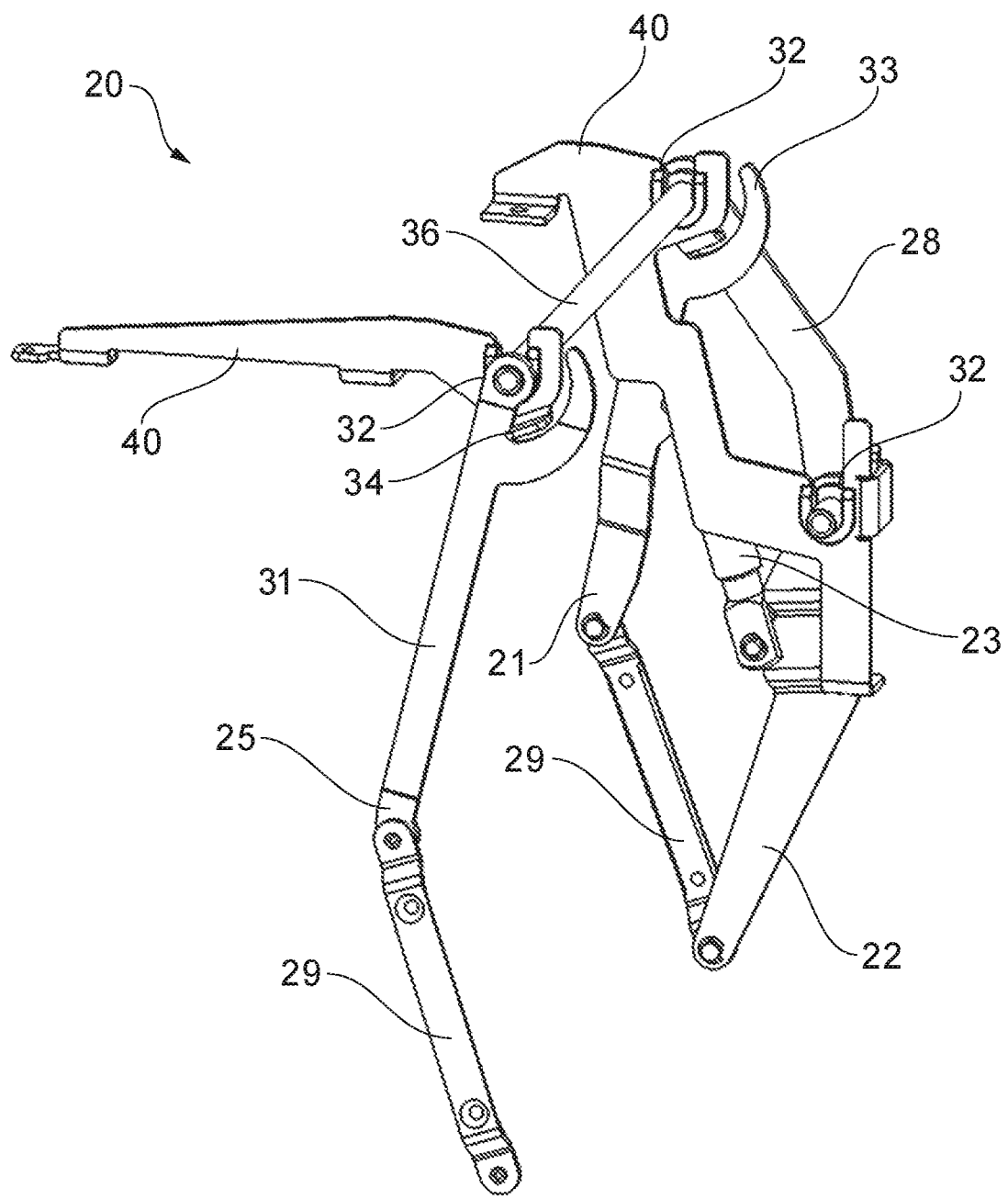
FIG. 5 shows the lifting device viewed from the second side of the incinerating toilet and the cradle and lock pin arrangement in a locked position.

FIG. 5 shows the lifting device 20 viewed from the side of the auxiliary lifting arm 31. The auxiliary lifting arm 31 is fixedly connected to the through-going shaft 36 at one end, which end is arranged on a cradle 32 connection, such that it is pivotably connected (rotatable inside the cradle). The cradle 32 connection is arranged on the toilet unit 40. The cradle 32 may be mounted on an arm or mounted directly to the toilet unit 40.

The one end of the auxiliary lifting arm 31 comprises a hook 33 arranged such that it is in cooperation with a pin 34 provided adjacent to the cradle 32 and mounted on the toilet unit 40. The pin 34 prevents the auxiliary lifting arm 31 and the trough-going shaft 36 to be removed (lifted off) from the cradle 32 by interaction with the hook 33 in a locking position, while allowing the auxiliary lifting arm 31 and the trough-going shaft 36 to be removed (lifted off) from the cradle 32 in an open position. The pin 34 and hook 33 locking device is arranged such that pin 34 is restrained inside the gap of the hook 33 in the first position, preventing the end of said lifting arm 31 to be removed from the cradle 32, while in the second position the hook 33 is rotated such that pin 34 is located outside the gap of the hook 32, such that the pin 34 is be "released", thereby allowing the end of said lifting arm 31 to be removed from the cradle 32.

Figure 6:
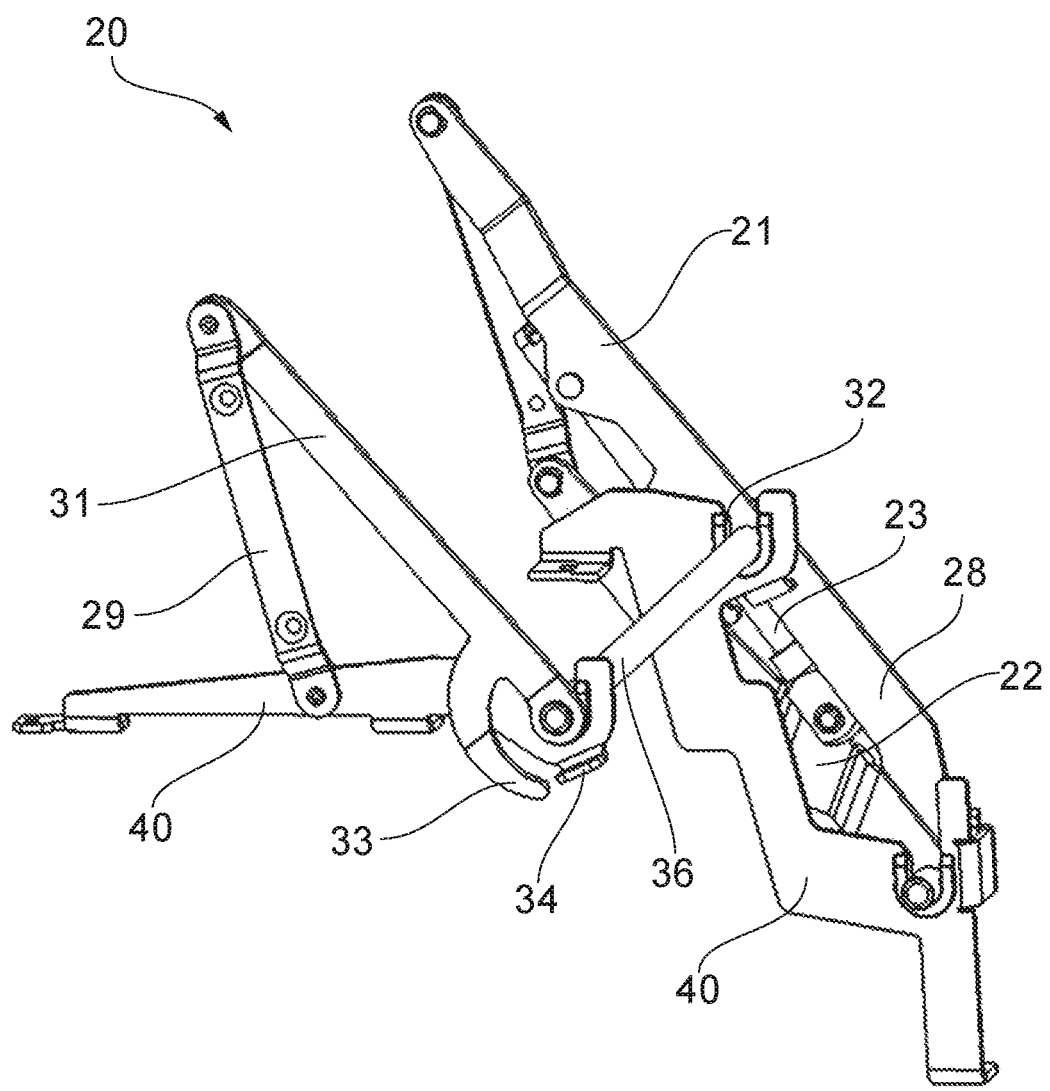
FIG. 6 shows the lifting device of FIG. 5 in the second position where the cradle and lock pin arrangement are in an open position.
Figure 7:
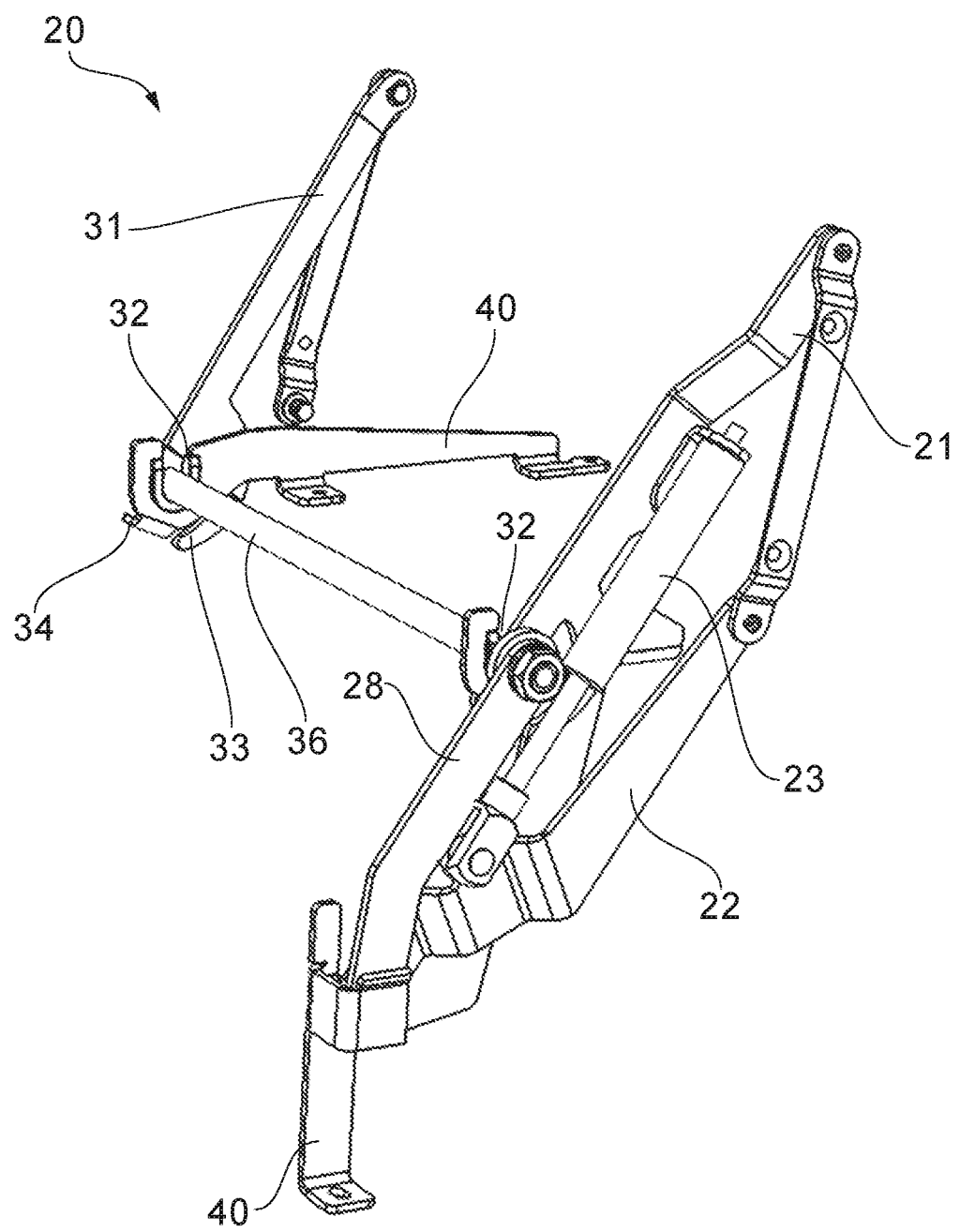
FIG. 7 shows the lifting device of FIG. 6 viewed from the opposite side.

FIGS. 4 and 5 shows the lifting arms 21,22, he first position where the pin 34 and hook 33 is in a locking position, FIGS. 6 and 7 shows the lifting arms 21,22,31 in the second position where the pin 34 and hook 33 is in an open position.

FIGS. 6 and 7 shows the pin 34 and hook 32 locking device in the second position, where the auxiliary lifting arm 31 has been rotated such that the hook 32 opening is "released" from the pin 34.

A hook 32 and pin 34 locking device as described above, can be provided correspondingly on at least one of the first 21, second 22 or auxiliary 31 lifting arm. Preferably the pin 34 and hook 32 locking device can be provided on the first 21 and auxiliary 31 lifting arm.

Figure 8A:
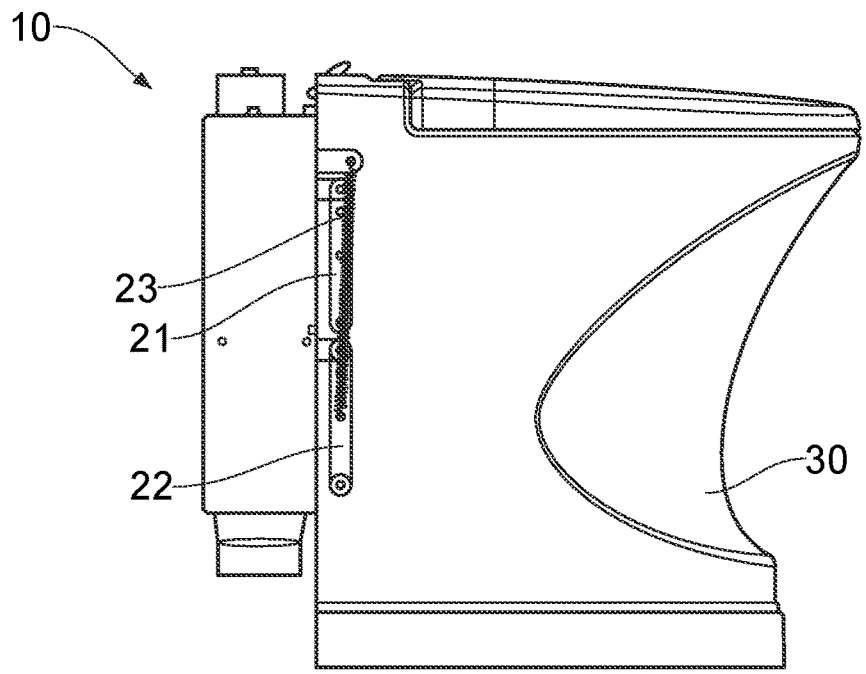
FIG. 8a)-b) shows the spring-loaded device as a torsion spring, tensioned in first position 8a) and activated and moved to a second position in FIG. 8b).

FIG. 8a) shows the lifting device comprising a pretensioned spring-loaded device 23 in the first position where the toilet casing 30 is covering the toilet unit 40. The spring-loaded device is a mechanical spring 23 which is upon activation releases its potential energy and activates the lifting arms 21,22 for lifting the toilet casing.

Figure 8B:
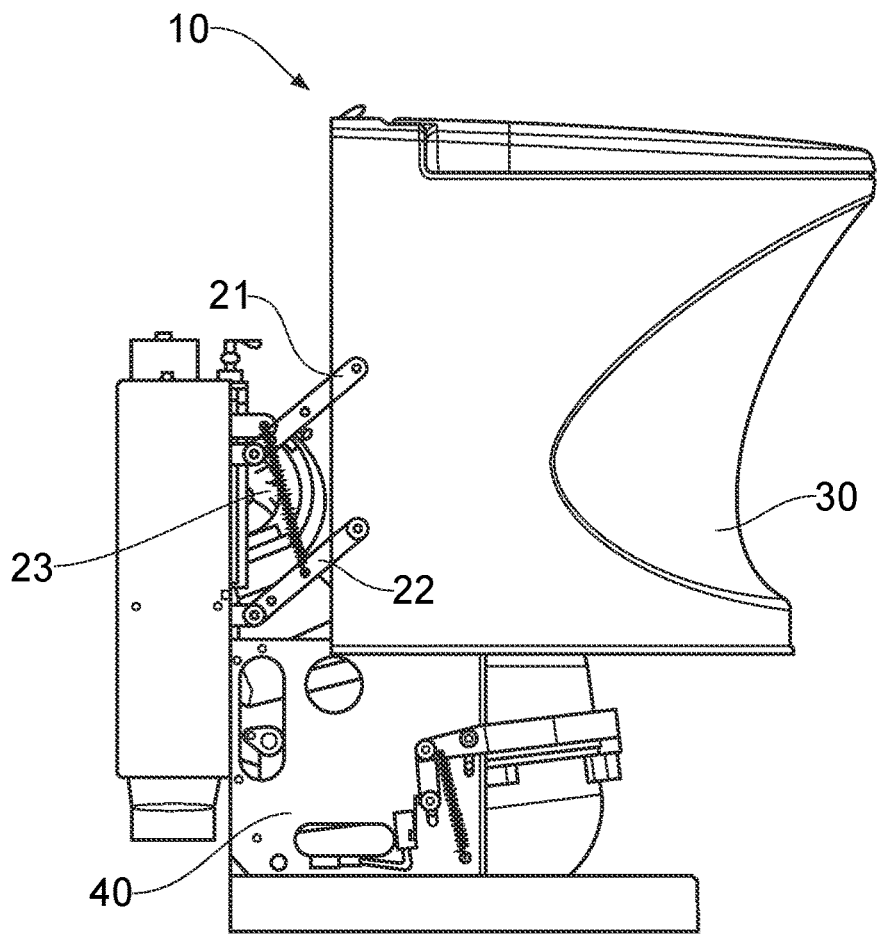

FIG. 8b) shows the toilet casing in the second position where the mechanical spring has lifted the second lifting arm 22 and also corresponding first lifting arm 21 for moving the toilet casing 30 relative to the toilet unit 40.

The first 21 and second 22 lifting arm are connected at their respective ends to the toilet unit 40 and toilet casing 30. The mechanical spring 23 are connected to the toilet unit 40 at one end and to the second lifting arm 22 at opposite end.

Figure 9A:
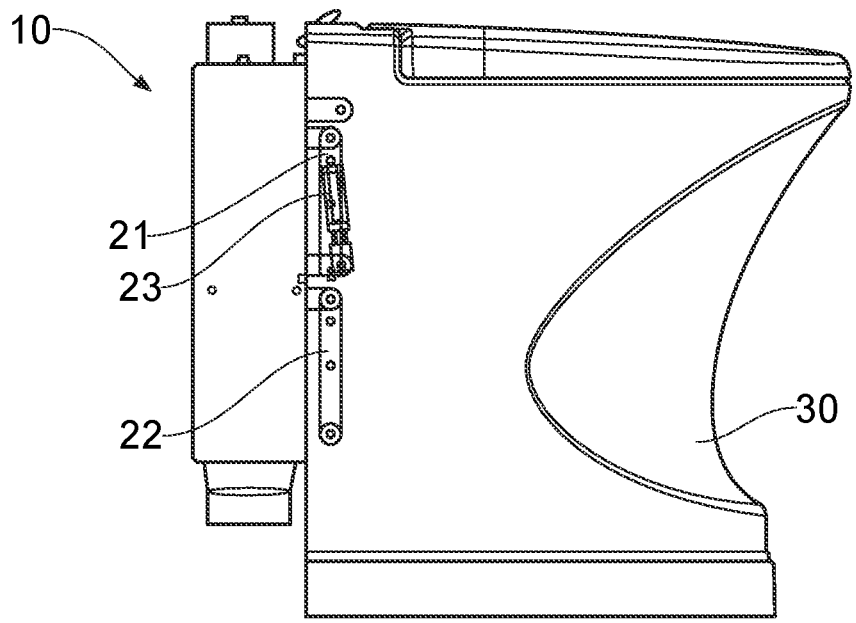
FIG. 9a)-b) shows the spring-loaded device as a gas strut, tensioned in first position 9a) and activated and moved to a second position in FIG. 9b).
Figure 9B:
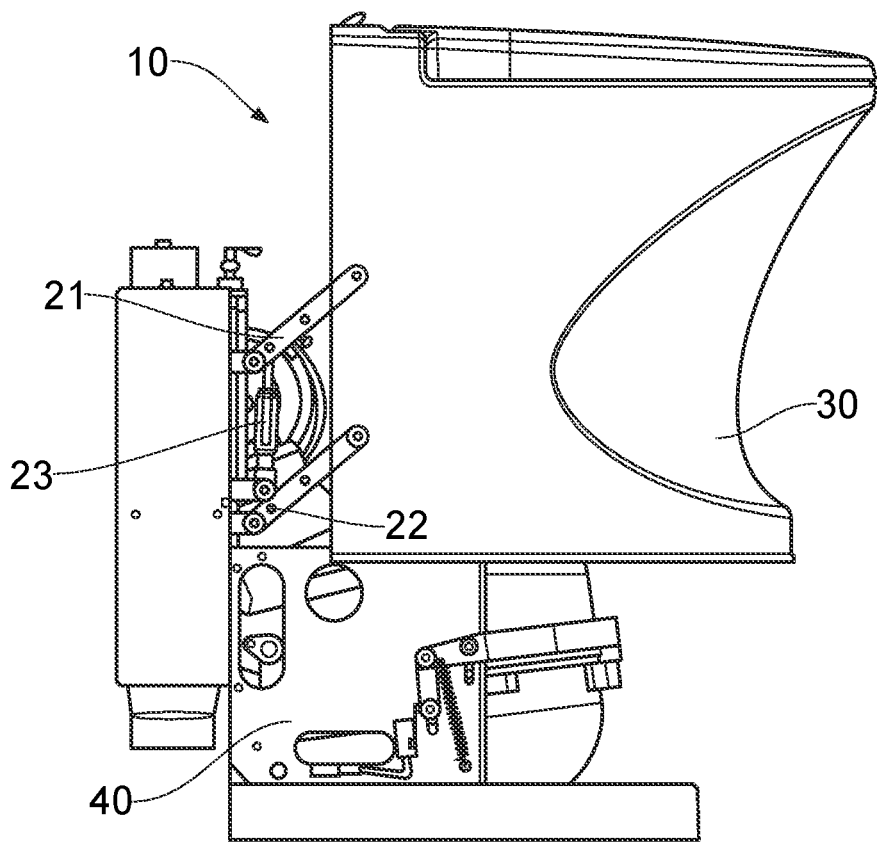

FIGS. 9a) and 9b) illustrates the same lifting arms as in FIGS. 8a) and 8b). The spring-loaded device is replaced with a gas strut 23 connected at one end to the toilet casing 30 and opposite end to the first lifting arm 21. Upon activation, the gas strut 23 is lifting the first lifting arm 21 such that the toilet casing 30 is moved to the second position.

Figure 10A:
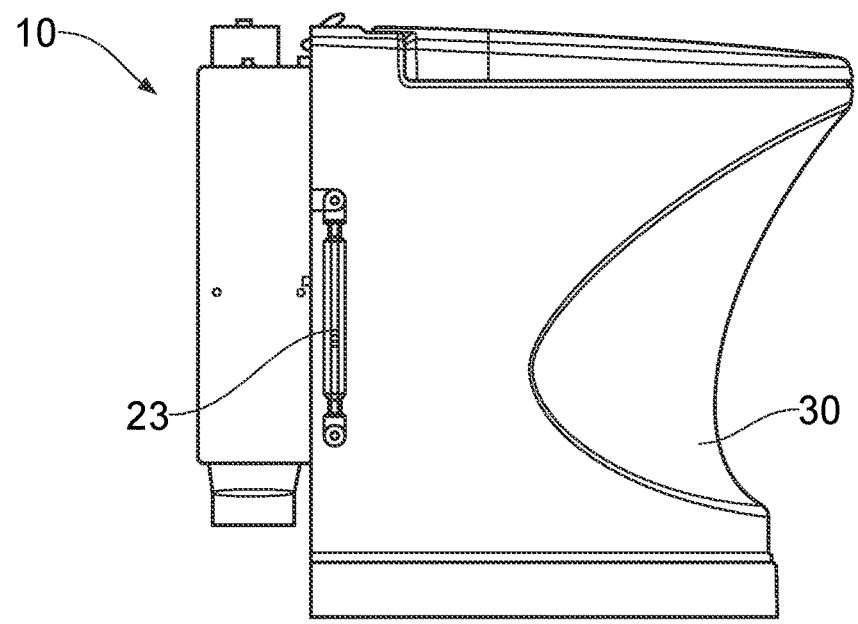
FIG. 10a)-b) shows hinged toilet casing and wherein the gas strut are connected for tilting the toilet casing from the first position 10a) to the second position 10b).
Figure 10B:
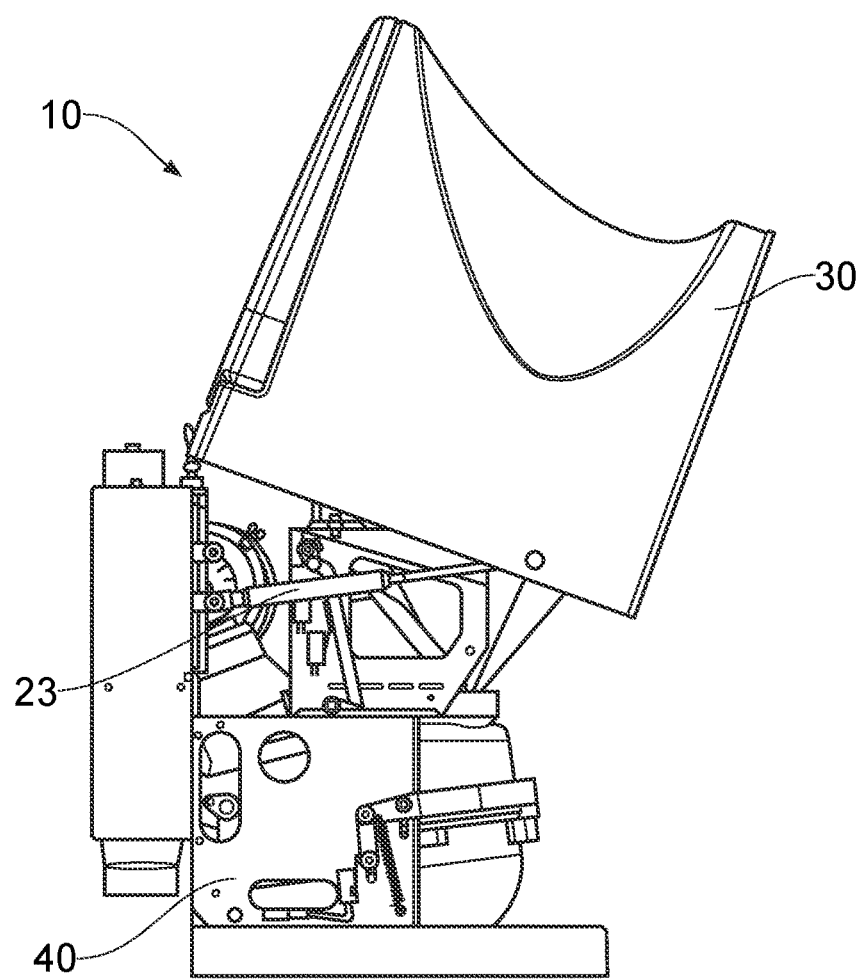

FIGS. 10a) and 10b) shows a toilet casing in the first position 10a) in which the toilet casing 30 is covering the toilet unit 40 and in the second position 10b) in which the toilet casing 30 is moved or tilted relative to the toilet unit 40. The toilet casing 30 is connected to the toilet unit 40 at the upper part by a hinge. A gas strut 23 is connected at first end to the toilet unit 23 and second end to the toilet casing 30. Upon activation of the gas strut 23 the toilet casing 30 pivots around the hinged connection. Thus, moving the toilet casing 30 relative to the toilet unit 40 and to the second position in which access to the toilet unit 40 has been provided.

Although preferred embodiments of the invention have been illustrated in the accompanying drawings and in the foregoing detailed description, it will be understood that the invention is not limited to the embodiments disclosed, but is capable of numerous arrangements, modifications, and substitutions of parts and elements.

The invention claimed is:

1. An incinerating toilet comprising:
    a toilet unit comprising a toilet bowl, an incineration chamber, and an ash tray,
    a toilet casing arranged so as to cover a front and sides of the toilet unit and having a toilet cover and sitting ring connected on top, and
    a lifting device arranged for moving the toilet casing relative to the toilet unit, from a first position in which the toilet casing is covering the toilet unit, to a second position allowing access to the toilet unit in order to perform service and maintenance, wherein the lifting device comprises a spring-loaded device connected to the toilet casing and adapted to store mechanical energy in the first position, in order to provide a push or pull force when activated, for moving the toilet casing from the first position to the second position, and
    wherein the spring-loaded device comprises a first end connected to the toilet unit and a second end connected to the toilet casing.

2. The incinerating toilet according to claim 1, wherein the spring-loaded device is a gas strut, a mechanical strut, or a torsion spring.

3. The incinerating toilet according to claim 2, wherein the spring-loaded device is a gas strut.

4. The incinerating toilet according to claim 1, wherein the lifting device comprises one or more lifting arm connected to the toilet casing and wherein the spring-loaded device is connected to the toilet casing via the one or more lifting arm.

5. The incinerating toilet according to claim 4, wherein the one or more lifting arm is connected to the toilet unit in a cradle provided on the toilet unit.

6. The incinerating toilet according to claim 5, wherein at least one of the one or more lifting arm comprises a hook adapted to cooperate with a cooperating pin provided on the toilet unit adjacent to the cradle, which hook and cooperative pin are arranged to be in a locked position during movement of the toilet casing from the first position to the second position, and wherein the hook and cooperative pin are arranged to be in an open position when in the second position, so that the one or more lifting arm can be lifted off the cradle such that the toilet casing can be separated from the toilet unit .

7. The incinerating toilet according to claim 4, wherein the one or more lifting arm constitutes a first lifting arm provided at one side of the toilet and an auxiliary lifting arm provided at opposite side, and wherein the lifting device further comprises a through-going shaft connected between the first lifting arm and the auxiliary lifting arm, and wherein movement of the first lifting ann at one side of the incinerating toilet, is transferred simultaneously through the through-going shaft to the auxiliary lifting arm, thus providing a synchronous lifting movement of the toilet casing.

8. The incinerating toilet according to claim 7, wherein the one or more lifting arm further constitutes a second lifting arm, the first and second lifting arms are arranged with a vertical distance between each other at one side of the incinerating toilet, and wherein each lifting arm has a first end connected to the toilet unit and a second end connected to the toilet casing and wherein the spring-loaded device is connected to at least any one of; the first lifting arm or the second lifting arm.

9. The incinerating toilet according to claim 8, wherein in the first position, the first end of respective first and second lifting arm is in a position located vertically above the second end of respective first and second lifting arm,
wherein in the second position; the second end of respective first and second lifting arm is in a position located vertically above the first end of respective first and second lifting arm.

10. The incinerating toilet according to claim 1, wherein the toilet casing is fabricated in one piece such that is covers the front and side parts of the toilet unit.

11. The incinerating toilet according to claim 1, wherein the incinerating toilet comprises a locking means provided on respective toilet unit and the toilet casing for interaction and for retaining the toilet casing into the toilet unit.

12. The incinerating toilet according to claim 11, wherein the toilet unit comprises a protrusion for mating with a circumferential back opening of the toilet casing such that the toilet casing is retained into the toilet unit in the first position.

* * * * *